Sept. 4, 1956     O. E. HINTZ ET AL     2,761,742
BLOWER PIPE SEPARATING AND POSITIONING ARRANGEMENT
Filed Dec. 22, 1952     2 Sheets-Sheet 2
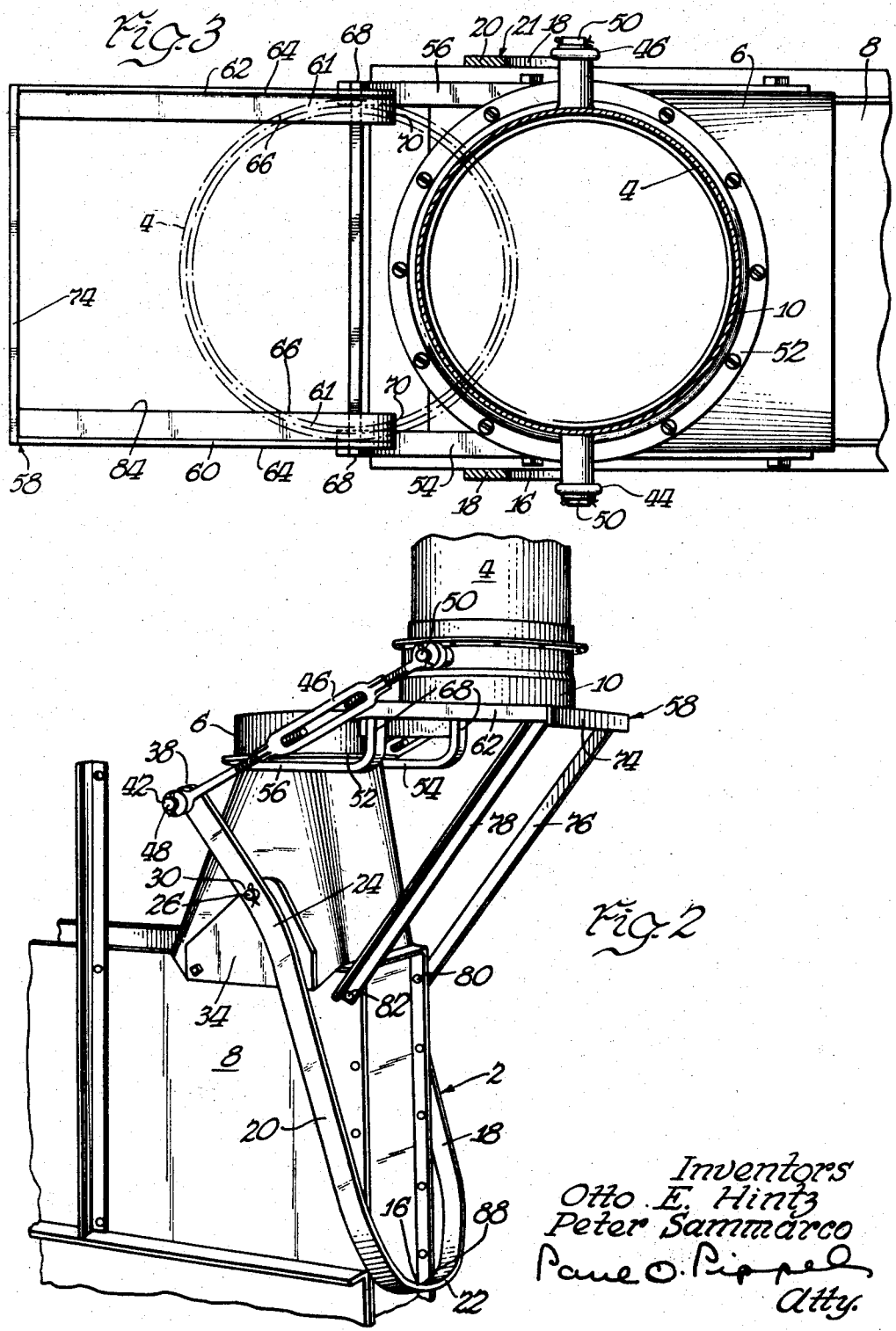

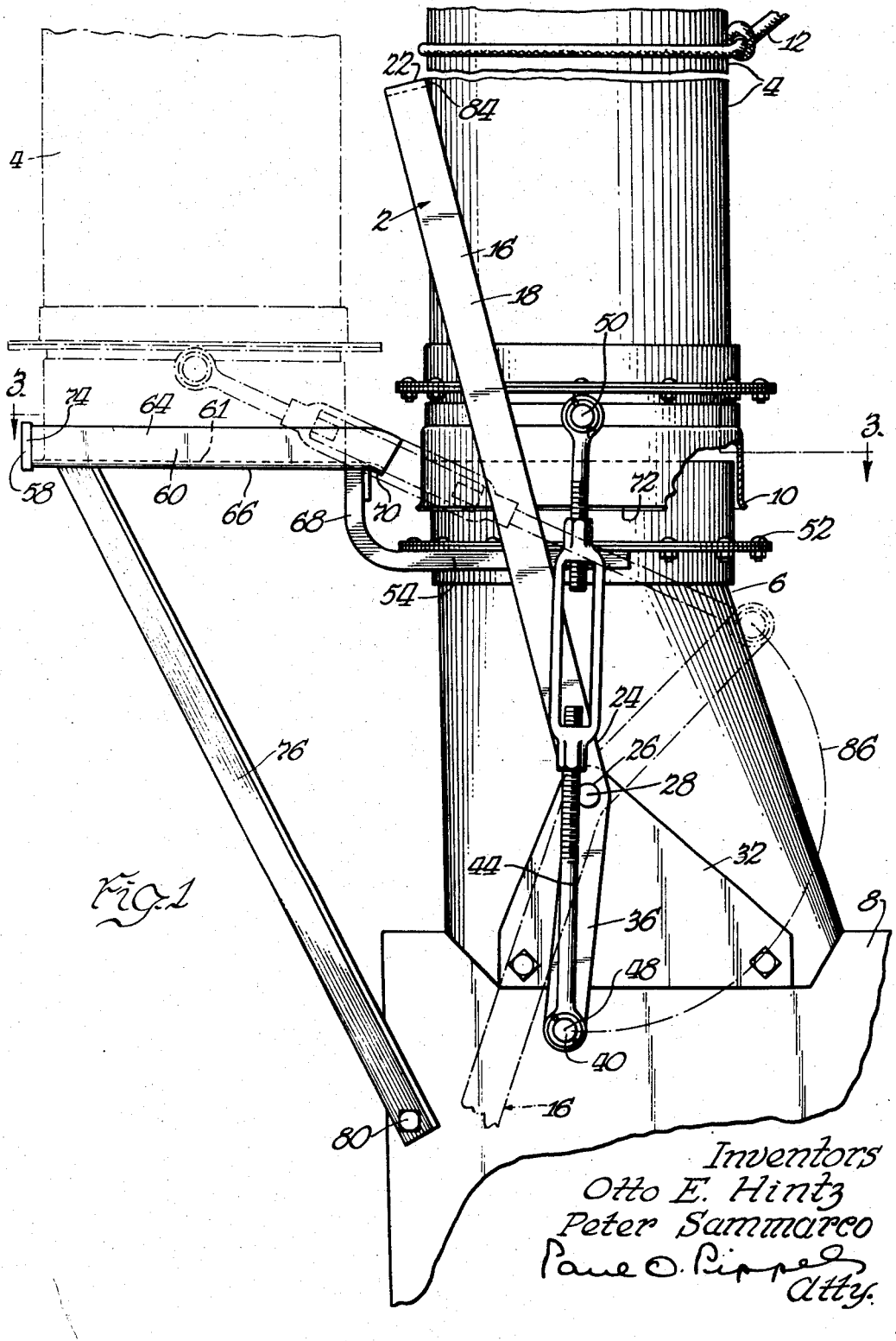

United States Patent Office 2,761,742
Patented Sept. 4, 1956

2,761,742

BLOWER PIPE SEPARATING AND POSITIONING ARRANGEMENT

Otto E. Hintz, Riverside, and Peter Sammarco, Chicago, Ill., assignors to International Harvester Company, a corporation of New Jersey Application December 22, 1952, Serial No. 327,371

11 Claims. (Cl. 302—64)

This invention relates to a novel linkage and arrangement for separating and positioning in transaxial misalignment pipe sections of a forage blower for easy access thereinto to facilitate cleaning when such piping becomes plugged.

Heretofore recourse was had to the provision of various access doors in the sides of the pipes or other portions of the conveying ductwork. This has proved at best makeshift inasmuch as it requires a right angle turn into the pipe which precludes admittance of a rigid poker of any substantial length to the clogged region and thus necessitates piecemeal, tedious removal of the accumulation. Furthermore, the cut-outs in the pipes etc. not only weaken the structure, which requires reinforcement, but also complicates manufacture.

A general object of the invention is to provide a novel linkage which may be operated by a single person without the necessity of bodily lifting ungainly, heavy, lengthly pipe sections such as are extended alongside a silo.

A more specific object is to devise a novel lever linkage which effects axial separation of the pipe sections followed by lateral movement of one of the pipe sections with respect to the other and onto a support stand carried by the latter.

A further object is to provide a novel guide for the moving pipe section to direct it onto and off the support stand.

These and other objects of the invention will become more apparent from the specification and the drawings wherein:

Figure 1, is a side elevational view of telescoped pipe sections of a blower with the operating linkage applied thereto, the assembly being shown in solid lines in telescoped operating position and in phantom lines in transposed position.

Figure 2 is a perspective view taken from the opposite side of that shown in Figure 1; and Figure 3 is a cross-sectional view taken substantially on the line 3—3 of Figure 1 with the pipes shown in straddled relationship.

Describing the invention in detail, the novel operating linkage designated 2 is shown in association with upper and lower telescoping blower pipe sections 4 and 6 of which the blower pipe section 6 is connected and communicates with the housing 8 of a conventional blower constituting a foundation or support structure such as shown in U. S. Patent No. 2,532,064. It will be noted that the upper extremity of the section 6 telescopes into the lower downwardly flared portion 10 of the upper blower pipe section 4, the section 4 being adapted to be positioned alongside a silo and being movably anchored adjacent to its upper end as by a flexible member in the form of a rope 12 suitably secured or anchored to the silo wall or any convenient boom supported thereby as is conventional practice. It will be appreciated that the upper section 4 is thus movable vertically as well as laterally.

The lever linkage 2 comprises a U-shaped lever member 16 including a pair of laterally spaced arms 18 and 20 interconnected at the bight of the U by a cross-member 22 forming a convenient handle and stop. The legs 18 and 20 receive the pipe sections therebetween and it will be seen from a consideration of Figures 1 and 2 that these legs 18 and 20 are in the form of bell crank levers interconnected at their outer extremities by the cross-piece 22 and each leg is pivoted adjacent to its elbow 24 on a generally horizontal axis 26 through the medium of coaxial pins 28 and 30, the axis 26 lying within a transverse central axial plane of the pipe sections 4 and 6. The pins 28 and 30 are mounted on support brackets 32 and 34, respectively, which in turn are suitably secured to the respective sides of the pipe section 6 and may be considered a part thereof. The inner lower ends 36 and 38 of the lever arm 18 and 20 are pivoted by coaxial pins 40 and 42, respectively on an axis 48 to the lower ends of upstanding adjustable links 44 and 46, which at their upper ends are pivoted on an axis 50 being constituted by outstanding pins on pipe 4 generally parallel with the axes 26 and 48 and in the telescoped position of the pipe sections 4 and 6 preferably lying within the before mentioned plane containing the axis 26. The axis 48 of the pins 40 and 42 in the telescoped position of the pipe sections 4 and 6 is preferably at one side of the plane of the axes 26 and 50.

The lower pipe section 6 comprises an outturned flange 52, which at each side of the pipe section 6, may be suitably fastened to stand-off members 54 and 56 of a support stand generally designated 58.

The stand 58 may comprise generally parallel slide rails 60 and 62 at opposite sides thereof spaced to conveniently admit the lower end section 10 of the upper pipe segment 4, the rails 60 and 62 being of L-section and each comprising an upstanding outboard flange 64 and an inwardly projecting bottom flange 66 along the lower edge of the related flange 64. The inboard or inner edges of the rails 60 and 62 may be fastened at their undersides to the upper ends of upturned end portions 68 of the stand-off members 54 and 56 and may extend inwardly therebeyond and may be turned downwardly as at 70 to a point below the normal path of travel of the lower edge 72 of the lower portion 10 of the upper pipe section 4 as it is being moved from the position shown in solid lines in Figure 1 to the position shown in phantom lines in Figure 1. The seating surfaces 61, 61 on the top sides of rails 60 and 62 are at their inboard edges 70 slightly below the upper edge of the bottom pipe section and outboardly thereof or slightly above this edge. It will be seen that in separated position, the upper pipe section seats with its lower edge 72 on the top sides 61, 61 of the flanges 66 of the rail 60 and 62 and is received between the upstanding flanges 64, 64 of said rail 60, 62. Lateral displacement of the pipe sections is limited by an upright stop piece or rail 74 connected across the outer extremities of the side rails 60 and 62 and the outer ends of these rails are connected on their underside to the upper ends of diagonal brace members 76 and 78 which at their lower ends are suitably connected as at 80 and 82 to an adjacent portion of the lower pipe section 6 or the housing 8. It will be seen from a consideration of Figure 3 that the stand 58 is of skeletal construction and supports the upper pipe merely along its edge 72 so that access in an axial direction to and from the pipe is feasible through an opening 84, circumscribed by said surfaces 61, 61.

In operation and assuming that the parts are as shown in solid lines in Figure 1, the cross-piece 22 bears as at 84 against the upper pipe section 4 and the lever 16 extends from its outer to its inner ends substantially downwardly. The operator may grasp either or both arms 18 and 20 and by pulling toward the left (Figure 1) effects a rotation of the lever 16 in a counterclockwise direction, Figure 1, about the axis 26, whereby swinging the points 40 and 42 and the axis 48 in the arc indicated 86 whereby initially raising the pipe section 4 off the upper end of the pipe section 6 and thereby separating the same. This is feasible inasmuch as the pipe sections 4 and 6 are loosely telescoped. Continued rotation of the lever 16 in a counterclockwise direction disposes the axis 48 of the points 40 and 42, at the lower end of the lever arms 18 and 20, to the right (Figure 1) of the axes 26 and 50 whereby the axis 50 and thus the upper pipe section 4 is caused to be moved to the left and the upper edge 72 of said upper pipe section is moved initially over the upper edge of the lower pipe section and then onto the track members and thereafter slid therealong until pipe section 4 is disposed in a position shown in phantom lines in Figure 1. The intermediate position of the pipes is shown in Figure 3.

In the separated position of the pipe section 4, the lever assembly 16 has been pivoted with its cross-piece 22 bearing as at 88 against the lower pipe section 6 or the housing 8 thereof. It will be noted that the stand 58 is narrow enough to pass the lever assembly 16 therebout.

In order to join the sections 4 and 6 together from the position shown in phantom lines in Figure 1, whereat they are separated, the lever assembly 16 is merely rotated in the reverse direction, that is clockwise, whereby sliding the upper pipe section 4 off the tracks and guiding it in the same path to a position in axial alignment with the lower section whereupon it telescopes therewith and the lever assembly 16 returns to its upper position.

It will be understood that the embodiment above described is merely chosen by way of illustration and not limitation, and that variations will be readily apparent and as indicated in the appended claims.

We claim:

1. An apparatus for separating and recoupling telescoped, upright, upper and lower pipe sections of a forage blower whereat said pipe sections are positioned alongside of a silo and said upper pipe section is movably anchored adjacent to its upper end thereto whereby it is movable a limited amount vertically and laterally, the improvement described in the coupled position of the pipe sections comprising: a generally upright lever disposed along said pipe sections and pivoted intermediate its ends to the lower pipe section on a generally horizontal axis disposed substantially coincident with an axial plane of said telescoped pipe sections, substantially upright link means having a lower end pivoted to the lower end of the lever and an upper end pivoted to the upper pipe section on axes generally parallel with said horizontal axis, a support at one side of said plane carried by the lower pipe section and presenting an upwardly facing support surface extending laterally outwardly from the lower pipe section and having a margin adjacent to the lower pipe section disposed at a level approximately coplanar with the upper edge of the lower pipe section, said surface outwardly of said margin positioned at a slightly higher level and adapted to guide and support the lower edge of the upper pipe section when the same is being laterally displaced from the lower section following separation therefrom, said lever rotatable about said first-mentioned axis in a direction displacing said lower end thereof in a direction away from said support and concomitantly initially lifting said link means and said upper pipe section and separating the latter from said lower pipe section, said lever further rotatable and angling said link means toward said support for transmitting transverse loads against the upper pipe section toward said support while the lower edge of the upper pipe sections straddles the upper edge of the lower section and said surface and is moved onto said surface, said stand provided with an opening through the surface and registrable axially with the interior of the upper pipe section upon the latter being seated upon the surface to provide access thereto for cleaning.

2. An apparatus for separating and coupling upright, upper and lower pipe sections of a forage blower structure described in the coupled position of said sections, a generally upright lever pivoted intermediate its ends from the blower structure on a generally horizontal axis, substantially upright link means disposed along the pipe sections and having a lower end pivoted to the lower end of the lever and having an upper end pivoted to the upper pipe section on generally parallel horizontal axes, a support carried on the structure and positioned at one side of said sections and presenting a peripheral upwardly facing support surface having an edge adjacent and slightly below the upper edge of said lower pipe section, said lever rotatable in a direction lifting said link means with said upper pipe section and uncoupling the upper pipe section from the lower and then angling said link means transversely of said pipe sections in a direction toward said support surface for displacing said upper pipe section thereon with its lower edge resting upon said support surface, said peripheral support surface circumscribing an access opening registrable with the interior of the upper pipe section to accommodate removal of material therefrom.

3. In a device of the class described, the combination with a pair of upper and lower, upright, telescoped pipe sections, said upper section having a lower edge and said lower section comprising an upper edge, a lever assembly of the first class pivoted on a point fixed intermediate its ends on a generally horizontal axis and having an output point spaced from said fixed point, translatory movement linkage including a rigid link having first and second linearly spaced pivot points and directly pivoted at said one point to said output point and directly pivoted at said second point to said upper pipe section and said lever assembly rotatable to swing said output point upwardly and then laterally and said link disposed to have endwise upward movement with the upper section and then lateral movement therewith so that the lower edge of the upper section rests above and at one side of said upper edge of the lower section in laterally displaced position of said upper and lower sections.

4. In a mechanism for separating telescoped, upright, upper and lower pipe sections and displacing the upper section laterally out of registry with the lower section, said mechanism described in the telescoped position of said sections, a support structure, a stand mounted on the structure and presenting an upwardly facing seating surface, a lever comprising spaced legs embracing said lower pipe section therebetween, a cross-member interconnecting one of the corresponding ends of said legs, said legs sloping downwardly from above said stand and having substantially vertically extending lower end portions, coaxial pivot means mounting said legs intermediate their ends on a generally horizontal axis, a pair of adjustable links extending upwardly from the lower ends of respective lower end portions of said legs and coaxially pivoted at their lower ends thereto on a generally horizontal axis substantially parallel with the beforementioned axis, said links having upper ends coaxially pivoted to opposite sides of said upper pipe section on an axis generally parallel to the beforementioned axis, said cross-member bearing against said upper pipe section.

5. The combination according to claim 4 and said surface having portions at opposite sides of said lower pipe section, and said lower pipe section having an upper edge extending slightly above said portions and said surface having other portions spaced from said lower pipe section at an elevation generally coplanar to said upper edge.

6. In a device of the class described, a blower structure having upper and lower pipe sections adapted to be telescoped for conveying material and separated and laterally displaced for clean out, said lower section having an upper edge and said upper section having a downwardly flared lower portion terminating in a lower edge of larger diameter than the lower section, means operatively associated with said sections for separating and displacing the upper section relative to the lower, supporting means on the blower structure for supporting the upper section when it is displaced laterally from the lower and comprising a platform with laterally spaced upwardly facing surfaces extending outwardly of the lower section and at one of their ends projected at opposite sides of the lower pipe section slightly below the upper edge thereof in receiving relationship to the lower edge of the upper pipe section as the upper section is being laterally displaced from the lower section.

7. The combination according to claim 6, and stop means on said supporting means at the ends of the platform remote from said lower pipe section and adapted for abutment with said lower portion of the upper pipe section to limit lateral displacement thereof relative to the lower section.

8. The combination according to claim 7, and upstanding guide flanges on the platform at the remote edges of said surfaces adapted to receive the lower portion of the upper section therebetween for holding it on said surfaces, said surfaces defining between their adjacent edges an access opening into the interior of the upper pipe section when the latter is positioned upon said support means.

9. In an arrangement of the class described, the combination with upper and lower telescoped pipe sections, lifting and lateral shifting means operatively disposed between said sections for separating and displacing the same laterally relative to one another and vice versa, and means disposed alongside of said sections and including a seating surface disposed in lateral extension of the upper edge of the lower section for supporting the upper section from its lower edges when said upper section is in laterally displaced position with respect to the lower section.

10. In a device of the class described, a foundation structure with upper and lower telescoped pipes sections extending upwardly therefrom, means carried by the structure and presenting an upwardly facing seating surface extending transversely of said pipe sections and having an edge adjacent to and substantially coincident with the upper edge of the lower pipe section to permit transposition of the upper pipe section to and from the upper edge of the lower pipe section, and a lever assembly pivotally carried by the structure and operatively connected with the upper pipe section and movable in a direction separating and moving said upper pipe section onto the surface and vice versa.

11. The combination of an upper pipe and a lower pipe having adjacent ends spaced axially and displaced laterally with respect to each other whereby the upper pipe is above and at one side of said lower pipe, an operating linkage for moving said upper pipe laterally into axial alignment with the lower pipe and then telescoping them together and comprising link means having an upper end thereof pivoted to said upper pipe section on a substantially horizontal axis and extending diagonally downwardly therefrom across said lower pipe section and terminating in a lower end thereof at a side of said lower pipe diametrically opposite to the said one side thereof, lever means pivoted intermediate the ends thereof on a generally horizontal fixed axis disposed below said lower end of said link means and having a first portion extending diagonally upwardly from the axis of pivot of said lever means to said lower end of said link means and pivoted thereto on a generally horizontal axis, said lever means having a second portion extending from said axis of pivot thereof diagonally downwardly in a generally opposite direction to said first portion.

References Cited in the file of this patent

UNITED STATES PATENTS

| 603,366 | Richl | May 3, 1898 |
| 937,405 | Abraham | Oct. 19, 1909 |
| 1,470,196 | Ruhmann | Oct. 9, 1923 |
| 1,528,268 | Schlegel | Mar. 3, 1925 |
| 1,868,231 | Heth | July 19, 1932 |
| 2,350,512 | Lanning | June 6, 1944 |
| 2,453,480 | Williamson et al. | Nov. 9, 1948 |

FOREIGN PATENTS

| 183,404 | France | May 10, 1887 |
| 196,958 | Germany | Apr. 1, 1908 |